United States Patent [19]

May

[11] Patent Number: 5,330,557
[45] Date of Patent: Jul. 19, 1994

[54] FLUID BED REDUCTION TO PRODUCE FLOWABLE MOLYBDENUM METAL

[75] Inventor: William A. May, Boulder, Colo.
[73] Assignee: Amax Inc., Englewood, Colo.
[21] Appl. No.: 59,501
[22] Filed: Dec. 28, 1992

Related U.S. Application Data

[63] Continuation of Ser. No. 479,026, Feb. 12, 1990, abandoned.

[51] Int. Cl.⁵ ............................................. C22B 34/34
[52] U.S. Cl. ..................................................... 75/623
[58] Field of Search .......................................... 75/623

[56] References Cited

U.S. PATENT DOCUMENTS

| | | | |
|---|---|---|---|
| 4,146,388 | 3/1979 | Lafferty et al. | 420/429 |
| 4,659,376 | 4/1987 | Carpenter et al. | 75/366 |
| 5,125,965 | 6/1992 | Sebenik | 75/392 |

FOREIGN PATENT DOCUMENTS 3030321 2/1988 Japan ................... 423/606

*Primary Examiner*—Melvyn J. Andrews
*Attorney, Agent, or Firm*—Hopgood, Calimafde, Kalil & Judlowe

[57] ABSTRACT

Flowable molybdenum metal powder of controlled particle size distribution is produced by stage-wise reduction wherein, in a first stage, molybdenum trioxide feed is preferably introduced at depth in a fluid bed of molybdenum dioxide and is reduced in an atmosphere containing at least 50% hydrogen, by volume, at a temperature between 560° and 620° C. and the product molybdenum dioxide is then reduced to molybdenum metal in a second stage fluid bed at a temperature between 1025° C. and 1075° C. in an atmosphere containing at least 50% hydrogen employed in amount of at least 2.75 times stoichiometric while controlling the off-gas dewpoint to be at least 21° C. and controlling the off-gas hydrogen:water vapor ratio so as not to exceed 24:1 and removing the product spheroidal molybdenum metal particles from the bottom of the bed to prevent collapse of the bed.

14 Claims, 5 Drawing Sheets

FLUID BED REDUCTION TO PRODUCE FLOWABLE MOLYBDENUM METAL

This application is a continuation of application Ser. No. 07/479,026 filed Feb. 12, 1990, now abandoned.

The invention is directed to stage-wise reduction of molybdenum trioxide to molybdenum metal in which each reduction stage is conducted in a fluid bed.

BACKGROUND OF THE INVENTION AND THE PRIOR ART

It is known that molybdenum trioxide is considered to be the most important molybdenum compound. In commerce, three common grades of $MoO_3$ are the Technical Grade (approximately 90% of more $MoO_3$), Grade B (approximately 98% $MoO_3$) and Pure Grade (approximately 99.9% $MoO_3$).

The reduction of molybdic oxide (molybdenum trioxide $MoO_3$) to metallic molybdenum has been the subject of considerable investigation. For example, in the November 1964 Journal of Metals, A. B. Michael and J. B. Hanway, Jr. pointed out the following: p1 "The hydrogen reduction of molybdic oxide has been demonstrated to occur in stages. During the reduction, molybdic oxide successively passes through several lower oxides and eventually metallic molybdenum is produced. The temperatures required for practical degrees of production progressively increase as the lower oxides are formed. For simplicity, however, the reduction may be considered to take place in two stages: (1) molybdic oxide ($MoO_3$) is reduced to molybdenum dioxide ($MoO_2$) at a temperature of approximately 500° C., and (2) molybdenum dioxide ($MoO_2$) is reduced to molybdenum metal at temperatures as low as 750° C.; a more practical temperature for the final state of reduction, however, is about 1000° to 1100° C."

The authors then proceeded to describe their development and testing of a single-stage fluid bed process for converting $MoO_3$ to Mo metal. Their process sought to retain the heat generated in the exothermic first stage of reduction within the reactor so that heat required to preheat the fluidizing hydrogen to accomplish the endothermic second stage of reduction would be kept within practical limits. It was postulated that the $MoO_3$ fed to the reactor would become molten enough to attach itself to the original bed particles before or while being reduced to the dioxide. It was considered this would result in general buildup or growth of bed particles so that the final molybdenum product would be granular. Michael et al. found an operating temperature in their single-stage bed approaching 955° C. was preferred. It is known, however, that at temperatures above 650° C., $MoO_3$ will sublime causing the bed to get sticky and eventually defluidize. U.S. Pat. Nos. 2,398,114; 2,987,932; 3,264,098; 3,865,573 and U.S. Pat. No. 4,045,216 can also be mentioned. In U.S. Pat. No. 2,398,114, a boat-and-tube furnace was used and batches of water-granulated $MoO_3$ were treated therein stagewise with the first stage being conducted at a temperature not substantially exceeding 630° C. in an atmosphere of dilute reducing gas which could be hydrogen, carbon monoxide, ammonia or mixtures with sufficient dilution of the reducing gas with diluents such as steam, nitrogen, or carbon dioxide to control the temperature rise in the exothermic first stage. The second stage reduction to molybdenum metal was then conducted in hydrogen at the higher temperature of about 1040° C. U.S. Pat. No. 2,987,392 is directed to the reduction of $MoO_3$ to molybdenum metal in a fluid bed which can be either single-stage or multi-stage using hydrogen as the reducing gas. U.S. Pat. No. 4,045,216 is directed to a continuous process for producing a dense pelletized metallic molybdenum product from pelletized molybdenum trioxide feed material in a vertical reactor using hydrogen as the principal reducing agent wherein, in a first stage molybdenum trioxide is reduced to molybdenum dioxide at preferably 600° to 640° C. in hydrogen which is diluted with nitrogen and water vapor and the second stage reduction of molybdenum dioxide to molybdenum is conducted at a temperature exceeding 900° C. using a gas richer in hydrogen than that used in the first stage. U.S. Pat. No. 3,865,573 is directed to the stepwise reduction of molybdenum trioxide to molybdenum dioxide at 500°–600° C. followed by reduction of the dioxide to metal at 800°–90020 C. Hydrogen, reformed gas or cracked ammonia are used as the reducing gas. Feed for the process is briquetted with iron or iron oxide powder to provide a metallized ferromolybdenum briquette for addition to molten steel. The patent notes that impurities merely pass through the process. U.S. Pat. No. 4,547,220 is directed to the reduction of molybdenum trioxide to molybdenum dioxide in a rotary kiln using ammonia as a reductant at a temperature of 400° to 500° C. U.S. Pat. No. 4,659,376, assigned to the same assignee as is the present application is directed to two-stage fluid bed reduction of molybdenum trioxide to molybdenum metal using ammonia as the fluidizing-reducing gas at 400° to 650° C. in the first state and hydrogen as the fluidizing-reducing gas at 700° C. to 1400° C. in the second stage. Significant reduction of impurities, particularly lead and zinc, is obtained.

The art recognizes that the reduction of $MoO_3$ to Mo metal is preferably conducted in stages to yield $MoO_2$ as the intermediate product, with separately controlled atmospheres and temperatures for each stage and using various processing procedures including reactors handling briquetted feed, the rotary kiln and the fluid bed. Both single stage and multi-stage operation are contemplated as well as the use of both static and moving beds of material.

Prior work by the present inventors indicated that defluidization of the bed seemed to occur more frequently during reduction of dioxide prepared from pure trioxide than it did when Grade B was the starting material. Also, Grade B oxide caused more defluidization problems than technical oxide. Since these materials contain increasing amounts of gangue (primarily aluminates and silicates), it was felt that these materials somehow aided fluidization.

Further study of the fluid-bed reduction of $MoO_3$, particularly of technical grade $MoO_3$ (90% or more $MoO_3$) has now demonstrated that improvements in the reduction process which result in materially and beneficially increasing the flowability of the Mo metal can be achieved by modifying material feeds and reduction conditions.

BRIEF DESCRIPTION OF THE INVENTION

Molybdenum trioxide, such as technical grade oxide or higher quality grades of $MoO_3$, is reduced in stages in a fluid bed by a process comprising establishing a fluidized bed of molybdenum dioxide with a fluidizing gas containing at least about 50%, by volume, hydrogen, heating the fluidized bed to a temperature between about 560° C. and 620° C., feeding molybdenum trioxide into the fluidized bed, discharging molybdenum dioxide from the fluidized bed and adjusting the feeding and discharging steps to provide an average residence time sufficient to insure that the discharged molybdenum dioxide is at least about 95% or 97% reduced as compared to the feed $MoO_3$. The resulting $MoO_2$ is then fed to the top of a fluid bed containing particles of mostly molybdenum metal and reduced in an atmosphere of hydrogen in stoichiometric excess of at least 2.75 at a temperature of 1025° to 1075° C. to obtain at least 96% reduction of the feed $MoO_2$ (i.e. 96% of the $MoO_2$ is reduced to metallic molybdenum to provide a product containing about 95% metallic Mo) while maintaining the off-gas dewpoint at a temperature of at least about 21° C. to prevent defluidization and removing product Mo metal from the bottom of the bed.

DETAILED DESCRIPTION OF THE INVENTION

Figure 1:
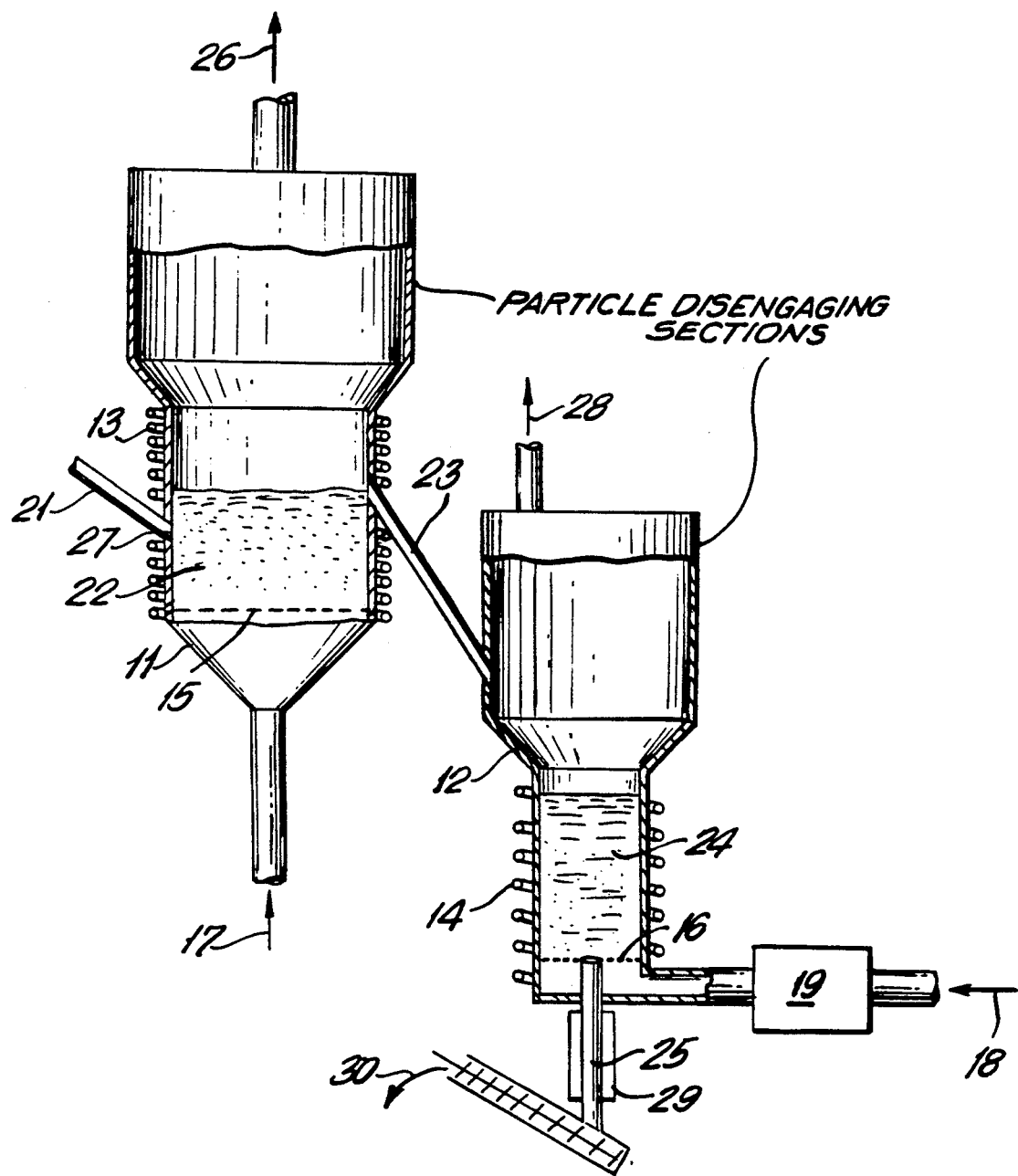
FIG. 1 depicts schematically the two-stage fluid bed reduction process of the invention.

The invention will now be described in conjunction with FIG. 1 of the drawing in which reference characters 11 and 12 denote fluid bed reactors which may be heated externally as indicated by coils 13 and 14. In each reactor is a distributor plate 15 and which serves to distribute incoming fluidizing-reducing gas 17 and 18. A preheater, see 19, is provided to bring the incoming fluidizing-reducing gas to the required temperature. Molybdenum trioxide to be reduced is fed into reactor 11 by feeder 21. The feed point 27 for feed $MoO_3$ is, preferably, at least about 20% of the depth of bed 22 in order to reduce the $MoO_3$ fines to $MoO_2$ and allow the fines to "grow". If the $MoO_3$ is fed above the bed (where the conditions are essentially non-reducing due to the minimal stoichiometric excess of reducing gas used), the fines will melt and stick to the upper walls of the reactor. Bed 22 in reactor 21 is almost entirely $MoO_2$. Overflow reduced oxide, $MoO_2$, flows through pipe 23 to serve as feed for reactor 12 in which bed 24 is almost entirely molybdenum powder. Reduced molybdenum particles are removed from the bottom of reactor 12 at 25. A screw conveyor or equivalent may be used for this purpose. Reducing-fluidizing gas containing at least 50% hydrogen, by volume, is fed to reactor 11 at 17 and brought to desired temperature in preheater 19. Heat requirements in reactor 11 are modest since the reduction reactions which convert $MoO_3$ to $MoO_2$ are exothermic. Preferably, the operating temperature within bed 22 is at least 560° and up to 620° C.

Gas flow is sufficient to maintain bed 22 in a state of fluidization but is below the flow rate which would cause loss of bed material through exhaust 26. Exhaust 26 can be provided with precipitators, filters or other devices for recovering fine solids from the exhaust gas. Due to the low stoichiometric excess in stage 1, the off gas is essentially $N_2 + H_2O$. Solids residence time in bed 22 can be one hour or more. Temperature within bed 22 can be varied between 560° C. and 620° C. It is to be appreciated that, in the fluid bed, dilution and mixing of feed material with bed material (product) occurs with great rapidity. A stoichiometric excess of hydrogen of at least 1.05 is required in the first stage.

As noted, product $MoO_2$ from reactor 11 overflows bed 22 and is led through pipe 23 to reactor 12 in which the powdered $MoO_2$ is reduced to metal using hydrogen as the fluidizing-reducing gas. Preheated reducing gas comprising at least 50% hydrogen, by volume, is fed at 18 and is led through distributor plate 16 to fluidized bed 24 which is composed almost entirely of product reduced molybdenum metal. Product metal powder is removed from bed 24 via pipe 25 which may be water jacketed as shown at 29. Upwardly tilted discharge screw 30 withdraws product from pipe 25. Conditions in reactor 12 include a temperature in the range of about 1025°-1075° C., to accomplish substantially complete reduction of $MoO_2$ to metal in 3 to 4 hours residence time. Exhaust 28 can be fitted with filters, precipitators, etc. to remove entrained dust which may be found in the exhaust gas and an be provided with regenerators to dry and recover the effluent reducing gas, e.g., hydrogen, for return to the process at 18. Reducing gas flow to reactor 12 is sufficient to fluidize the bed but well below the flow rate which would blow bed material out of the exhaust. It can be considered that each individual particle in the beds of reactors 11 and 12 is surrounded by fluidizing gas. Gas-solid contact hence is at the maximum. Impurity atoms contained within the individual bed particles are given time to diffuse to the particle surface from which they may be volatilized into the surrounding gas stream. Excess hydrogen of at least 2.75 stoichiometric, preferably 3 to 3.5, is employed in the second stage and feed rate is controlled to reduce at least 96% of the $MoO_2$ feed. It is most important from the standpoint of maintaining fluidization of the bed that off-gas dewpoint be maintained at a temperature of at least 21° Celsius, e.g., 21° to 25° C.

The analyses of various grades of molybdenum trioxide are given illustratively as follows:

TABLE

|         | Technical Grade | Grade B | Pure Oxide |
|---------|-----------------|---------|------------|
| % Fe    | 1.0             | 0.84    | 0.001      |
| % Al    | 0.3             | 0.11    | 0.0008     |
| % Pb    | 0.03            | 0.036   | 0.0002     |
| % Si    | 3.0             | 0.53    | 0.001      |
| % Sn    | 0.003           | 0.004   | 0.001      |
| % Cu    | 0.1             | 0.035   | 0.001      |
| % Zn    | 0.05            | 0.043   | 0.001      |
| % Bi    | 0.004           | 0.0025  | 0.001      |
| % $MoO_3$ | 90            | 98      | 99.9       |

The particle size distributions of representative $MoO_3$; (Grade B), of $MoO_2$ and product Mo metal are given graphically in FIGS. 2, 3 and 4 of the drawing, respectively. In each FIG. curve A is the Cumulative Volume Undersize in % and curve B is the Differential Volume in %. The curves show that the product $MoO_2$ and Mo display a much narrower particle size distribution then the starting MoO₃.

In the first stage fluid bed, the starting MoO₃ powder to be reduced preferably is introduced at a depth in the bed representing at least about 20% of the height of the bed. More preferably, the introduction point is at least 50% of the bed height below the top of the bed. This is important to accomplish the objective of reducing the MoO₃ fines and causing fines to "grow" in size. If the MoO₃ is fed above the bed, where conditions are essentially non-reducing, due to the minimal stoichiometric excess of reducing gas used, the fines will melt and stick to the upper walls of the reactor.

In the second stage reduction step, Mo powder product is removed from the bottom of the bed by means such as a screw conveyor. In this way, excessive growth of metallic particles, which could lead to collapse of the bed, is prevented.

Figure 2:
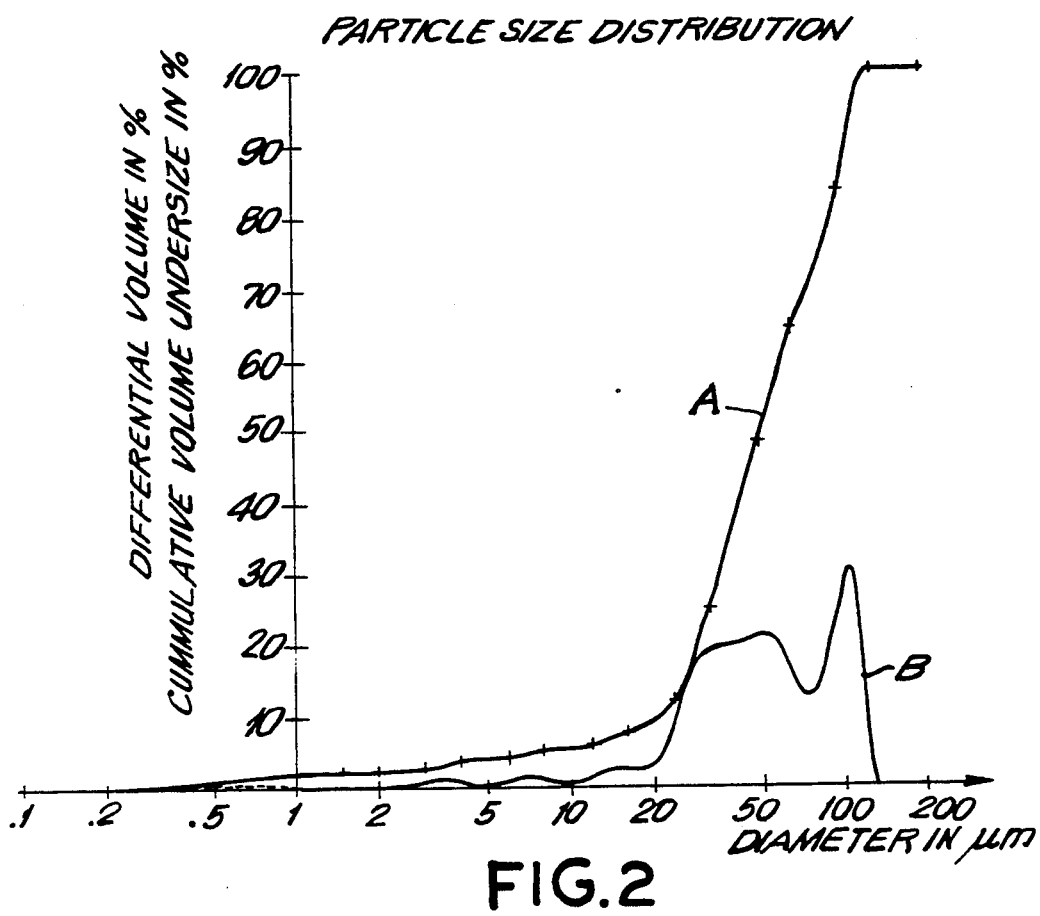
FIG. 2 depicts the particle size distribution plot for the starting molybdenum trioxide.
Figure 3:
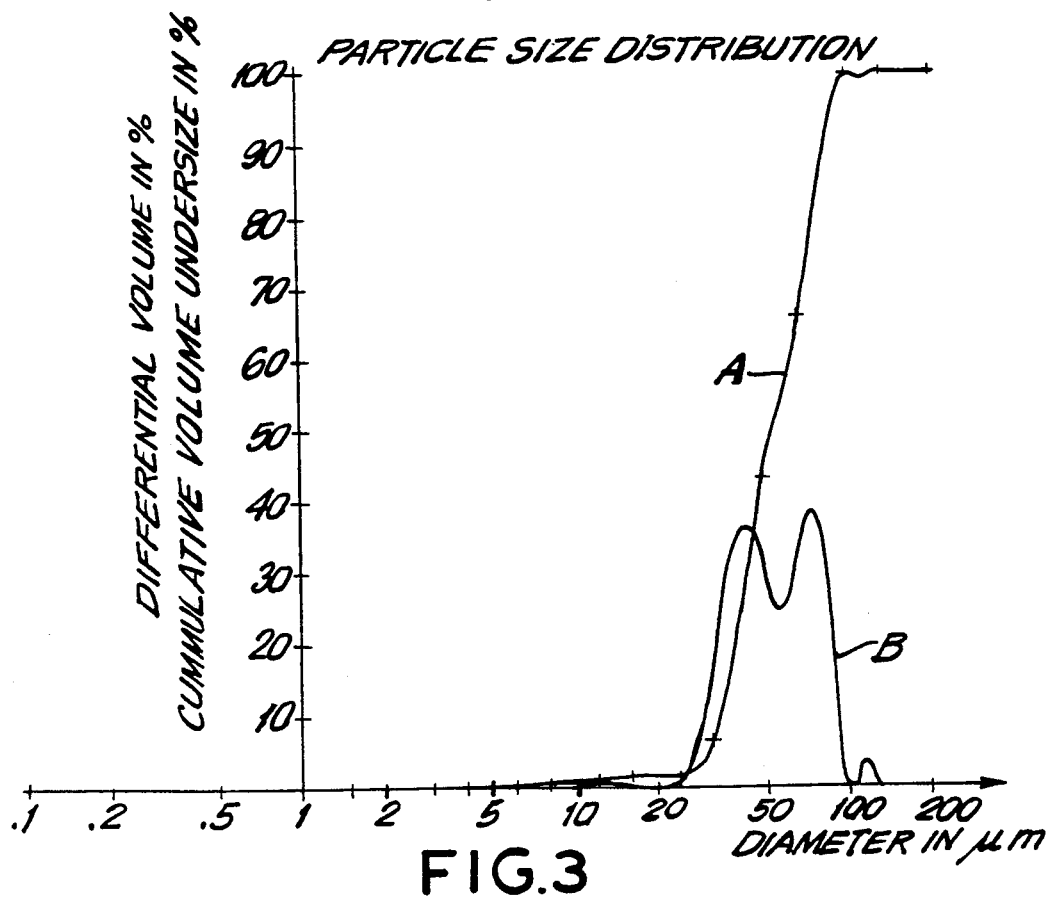
FIG. 3 depicts the particle size distribution plot for the molybdenum dioxide first stage product.
Figure 4:
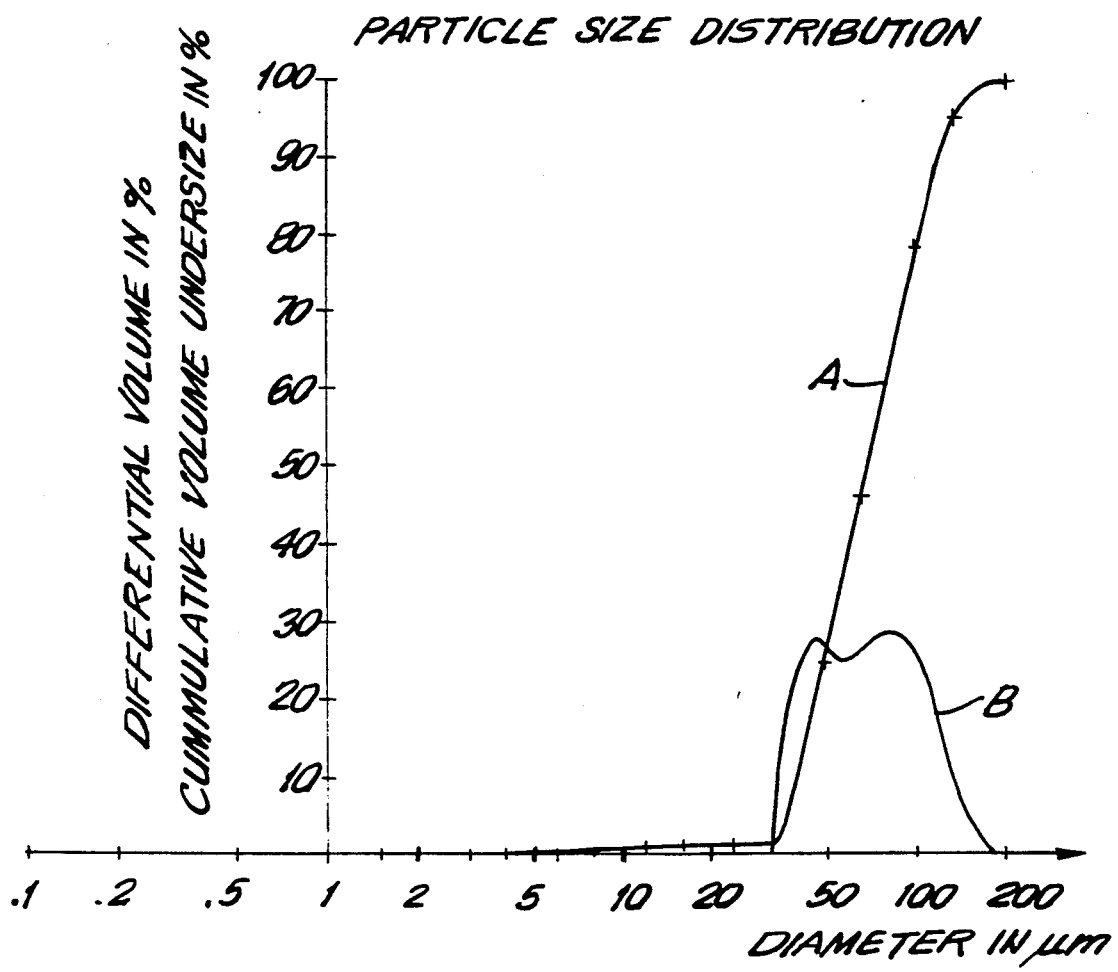
FIG. 4 depicts the particle size distribution plot for the molybdenum metal second stage product.
Figure 5:
FIG. 5 is a reproduction of a photomicrograph taken at 500 diameters of the molybdenum trioxide feed material (Grade B)
Figure 6:
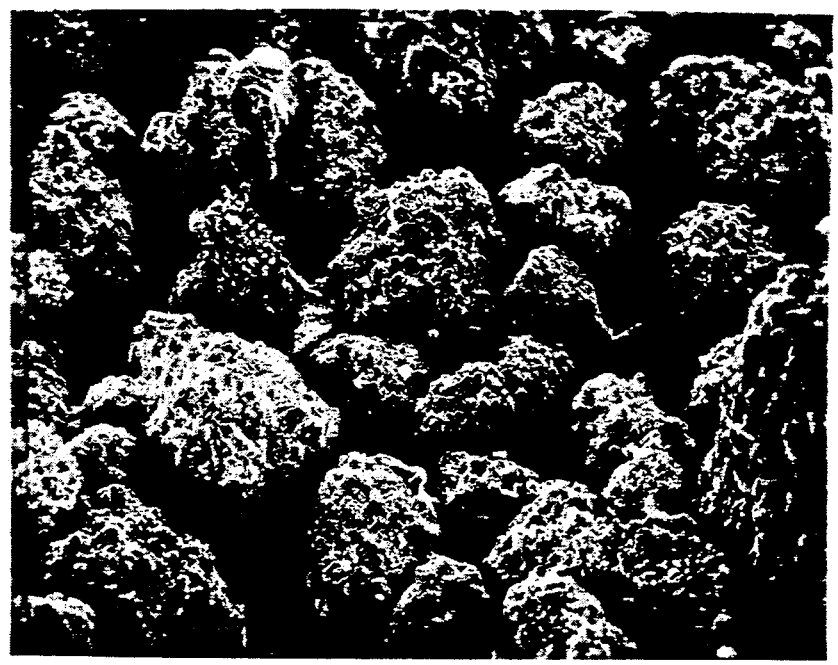
FIG. 6 is a reproduction of a photomicrograph taken at 500 diameters of the molybdenum metal product.

As is shown by comparing FIGS. 5 and 6, which are respectively, reproductions of photomicrographs taken at 500 diameters of MoO₃ powder and product Mo powder, the uniformity of size and actual size of the Mo powder are increased substantially as compared to the starting powder. Particle size distributions for the starting, intermediate and final powders are shown in FIGS. 2, 3 and 4, respectively, and the increase in size uniformity is marked. The Mo powder product particles are spheroidal in shape and have high flowability. The change in shape of the product powder as compared to the starting oxide is marked. When tested in the standard Hall Tester as described at pages 147–148, Vol. I of Goetzel's *Treatise on Powder Metallurgy*, Interscience Publishers, 1949, using a funnel having a 60° angle, a bottom orifice 0.1 inch in diameter and 1/8 inch long, flow rates of about 26 to about 28 seconds/50 grams are obtained. Four tests fell in the range 27.1 to 27.3 seconds/50 grams. The apparent density of the Mo product will be in the range of about 2.3 to about 2.4 grams/cc.

As noted, the fluidizing-reducing gas employed contains at least 50% hydrogen, by volume, and may comprise commercial hydrogen or cracked ammonia.

It is important in the first stage to use a temperature of at least 560° C. up to 620° C., preferably 580° C. to 600° C. because at temperatures below 560° C., the reaction kinetics are not as favorable and it is difficult to achieve greater than 85% conversion without long residence times and/or excessive reducing gas requirement and at temperatures above 620° C., the MoO₃ may start to get sticky faster than it can be reduced to MoO₂.

In the second stage, a temperature of at least 1025° C. is employed due to reaction kinetics and reasonable residence time requirements but temperatures above 1075° C. are avoided because of physical limitations of materials of construction. The product Mo powder material will contain no more than about 2%, preferably no more than about 1%, oxygen, i.e., at least about 96% of the MoO₂ has been reduced to metallic molybdenum. Mo powder products containing 0.5% to 0.75% oxygen can regularly be prepared in accordance with the invention.

In a pilot run made batch-wise using an experimental fluid bed reactor having a bed height of about 122 centimeters, a cracked ammonia atmosphere was used in the first stage at a temperature of 600° C. and in the second stage at a temperature of 1050° C., 70 pounds per hour of Grade B oxide having the analysis given in the Table using 126 standard cubic feet per hour of cracked ammonia in the first stage (110% of stoichiometry) and 150 standard cubic feet per hour of cracked ammonia in the second stage (300% of stoichiometry). The residence time was about 2 hours in Stage I and was about 4 hours in Stage II. A molybdenum metal product containing about 96% Mo (96% reduction) having an average particle size of about 20 to about 200 microns and having excellent flowability, e.g., about 27 seconds/50 grams was obtained from the second stage. In this pilot run, feed of MoO₃ was above the first stage bed, and the first stage MoO₂ product was introduced above the second stage bed using a screw feeder.

Once it was observed that the defluidization of the second stage could be controlled by controlling the dewpoint of the fluidizing gas, tests were conducted so that the off-gas dewpoint was approached from both directions. More specifically, it was determined (by monitoring the dewpoint of the reactor off-gas), that defluidization started to occur as feed material was reduced and the dewpoint fell below approximately 25 degrees centigrade. To establish if, in fact, it was the dewpoint which controlled fluidization, steam was injected into the fluidizing gas (prior to its entering the reactor) after the dewpoint had dropped to approximately 17 degrees centigrade and the bed had defluidized. Within seconds of injecting the steam, the dewpoint of the off-gas rose past 21 to 22 degrees centigrade and the bed material became refluidized.

Calculations were then made through which it was determined that the $H_2:H_2O$ ratio in the reactor off-gas at which this transition took place was approximately 24:1, indicating that the key parameter in preventing agglomeration in any reduction system is control of the hydrogen:water ratio. In accordance with the invention, reduction of molybdenum dioxide is carried out under controlled conditions such that the $H_2:H_2O$ ratio is not allowed to exceed 24:1. Under these conditions, it has been demonstrated that the oxygen content of the feed material can be successfully lowered from 25% to approximately 0.5 to 0.75% in a fluid bed reactor, representing a reduction of 96%, 97%, 98% more of the MoO₂ to Mo metal.

Figure 7:
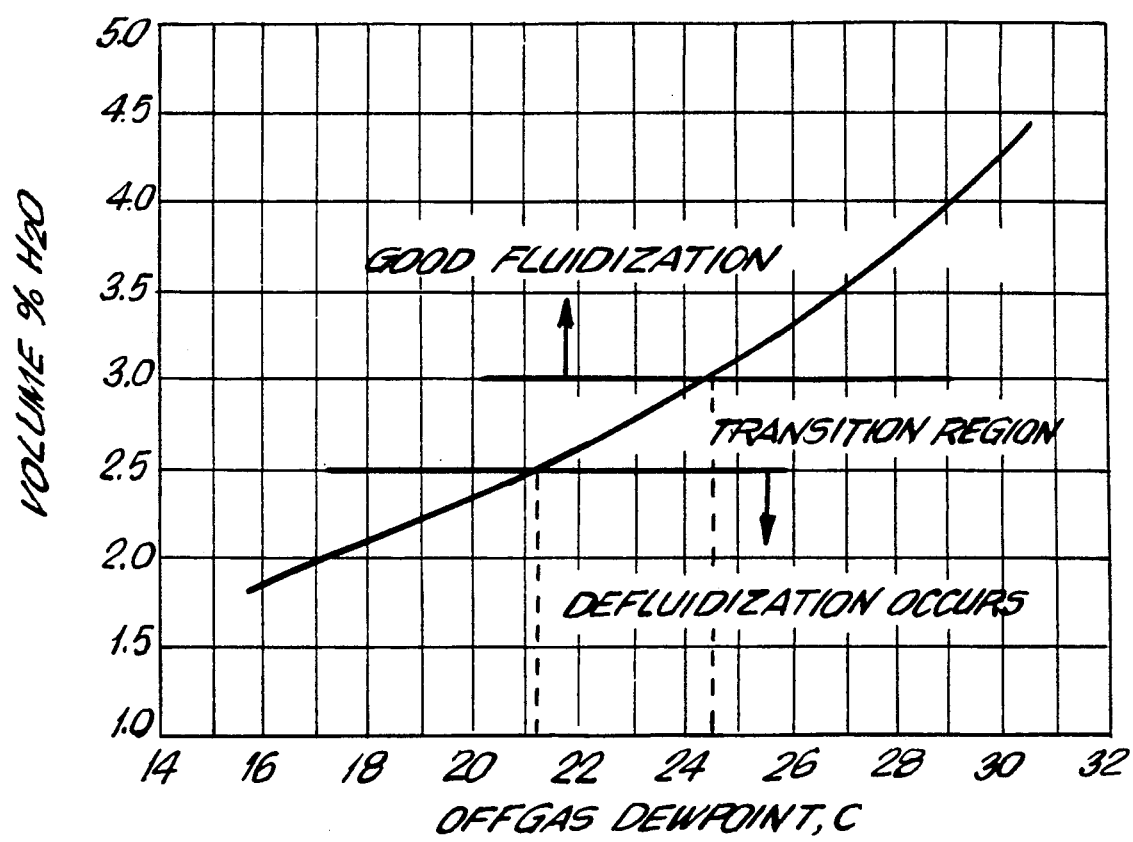
FIG. 7 is a plot relating volume percent water in the second stage off-gas to off-gas dewpoint in degrees Celsius.

FIG. 7 is a plot of off-gas percent water versus off-gas dewpoint which indicates the fluidization-defluidization zones determined.

Those skilled in the art know that most fluid bed reactions are conducted using a bed which is at least as high as it is wide.

The reduced, flowable Mo powder provided in accordance with the invention is useful in the production of irons and steels as an additive alloying agent.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for reducing molybdenum trioxide to molybdenum dioxide which comprises establishing a fluidized bed of molybdenum dioxide with a fluidizing gas containing at least about 50%, by volume, hydrogen, heating the fluidized bed to a temperature between about 560° C. and 620° C., feeding molybdenum trioxide into the fluidized bed at a point below the surface of the fluidized bed of at least about 20% of the depth of the fluidized bed, discharging molybdenum dioxide from the fluidized bed and adjusting the feeding and discharging steps to provide an average residence time sufficient to insure that the discharged molybdenum dioxide is reduced to the extent of at least about 95% compared to the starting molybdenum trioxide.

2. The process in accordance with claim 1 wherein said molybdenum dioxide is transferred to a second stage fluid bed and at least 96% of the MoO$_2$ is reduced to metallic molybdenum in a gas containing at least 50%, by volume, of hydrogen at a temperature of about 1025° to 1075° C. with an excess hydrogen of at least 2.75 times stoichiometric, while controlling the hydrogen to water vapor ratio in the off-gas so that it does not exceed 24:1, said molybdenum metal being withdrawn as substantially spheroidal, flowable particles from the bottom of said second stage fluid bed.

3. The process in accordance with claim 1 wherein said temperature is about 560° C. to about 620° C. and said hydrogen is 1.05 times stoichiometric.

4. The process in accordance with claim 3 wherein said temperature is about 570° C. to about 610° C.

5. The process in accordance with claim 2 wherein said hydrogen is in an amount of about 3 to about 3.5 times stoichiometric.

6. The process in accordance with claim 2 wherein said molybdenum metal has an average particle size of about 20 to about 200 microns, a substantially spheroidal shape and good flowability.

7. A process for reducing molybdenum trioxide to molybdenum dioxide which comprises establishing a fluidized bed of molybdenum dioxide with a fluidizing gas containing at least about 50%, by volume, hydrogen, heating the fluidized bed to a temperature between about 560° C. and 620° C., feeding molybdenum trioxide into the fluidized bed, discharging molybdenum dioxide from the fluidized bed and adjusting the feeding and discharging steps to provide an average residence time sufficient to insure that the discharged molybdenum dioxide is reduced to the extent of at least about 95% compared to the starting molybdenum trioxide, transferring said molybdenum dioxide to a second stage fluid bed and reducing said molybdenum dioxide at least 96% to molybdenum metal in a reducing gas atmosphere containing at least 50%, by volume, of hydrogen at a temperature of about 1025° C. to 1075° C. with an excess hydrogen of at least 2.75 times stoichiometric, while controlling the dewpoint of the off-gas to be at least 21° C., said molybdenum metal being withdrawn from the bottom of said second stage fluid bed as substantially flowable particles.

8. The process for reducing molybdenum dioxide to molybdenum metal in a fluid bed reactor at a temperature of about 1025° C., to 1075° C. using hydrogen as the active reductant and controlling the off-gas such that the hydrogen:water vapor ratio does not exceed about 24:1 so that fluidization of the bed is maintained.

9. A process for reducing molybdenum trioxide to molybdenum dioxide which comprises establishing a fluidized bed of molybdenum dioxide with a fluidizing gas containing at least about 50%, by volume, hydrogen, heating the fluidized bed to a temperature between about 560° C. and 620° C., feeding molybdenum trioxide into the fluidized bed, discharging molybdenum dioxide from the fluidized bed and adjusting the feeding and discharging steps to provide an average residence time sufficient to insure that the discharged molybdenum dioxide is reduced to the extent of at least about 95% compared to the starting molybdenum trioxide, transferring said molybdenum dioxide to a second stage fluid bed and reducing said molybdenum dioxide at least 96% to molybdenum metal in a reducing gas atmosphere containing at least 50%, by volume, of hydrogen at a temperature of about 1025° C. to 1075° C. with an excess hydrogen of at least 2.75 times stoichiometric, while controlling the hydrogen to water vapor ratio in the off-gas so that it does not exceed 24:1, said molybdenum metal being withdrawn from the bottom of said second stage fluid bed as substantially spherical, flowable particles.

10. The process as described in claim 9 wherein the molybdenum trioxide is fed into the fluidized bed at a point below the surface of the fluidized bed of at least about 20% of the depth of the fluidized bed.

11. The process as described in claim 10 wherein the molybdenum trioxide is reduced to molybdenum dioxide at a temperature between about 560° C. and about 620° C. and said hydrogen is at least about 1.05 times stoichiometric.

12. The process as described in 11 wherein said temperature is between about 570° C. and 610° C.

13. The process as described in claim 9 wherein said hydrogen in the second stage fluid bed is present in an amount between about 3 and 3.5 times stoichiometric.

14. The process in accordance with claim 9 wherein said molybdenum metal has an average particle size between about 20 microns and about 200 microns.

* * * * *

UNITED STATES PATENT AND TRADEMARK OFFICE
CERTIFICATE OF CORRECTION

PATENT NO. : 5,330,557

DATED : July 19, 1994

INVENTOR(S) : William A. May

It is certified that error appears in the above-identified patent and that said Letters Patent is hereby corrected as shown below:

```
Claim 3, column 7, line 20,
"1.05 times" should read
 --at least about 1.05 times--.
```

Signed and Sealed this

Eleventh Day of October, 1994

Attest:

BRUCE LEHMAN

*Attesting Officer*    *Commissioner of Patents and Trademarks*